United States Patent Office 3,471,299
Patented Oct. 7, 1969

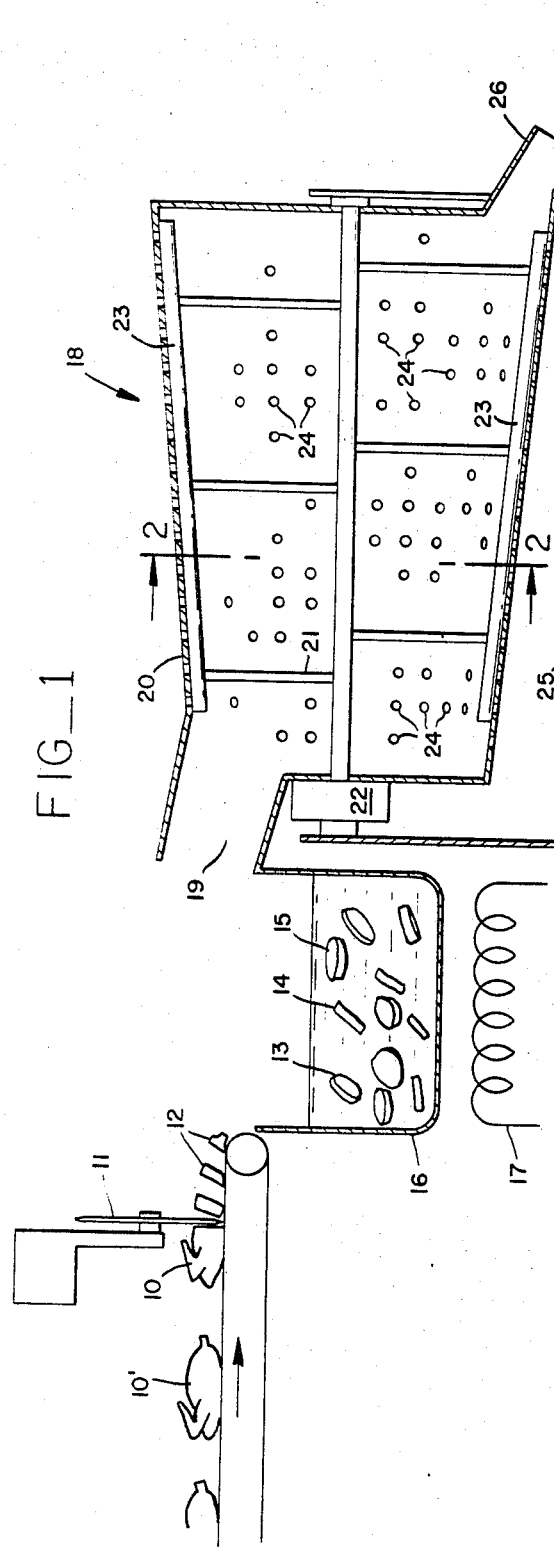
Oct. 7, 1969   L. J. DUCKWORTH ET AL   3,471,299
METHOD FOR DEBONING EVISCERATED WHOLE FOWL
Filed Jan. 12, 1966
INVENTORS
LEONARD J. DUCKWORTH
PAUL V. PETTINGA
PATRICK G. McGOWAN
BY
ATTORNEYS

3,471,299
METHOD FOR DEBONING EVISCERATED WHOLE FOWL
Leonard J. Duckworth, Paul V. Pettinga, and Patrick G. McGowan, Fremont, Mich., assignors to Gerber Products Company, Fremont, Mich.
Filed Jan. 12, 1966, Ser. No. 520,287
Int. Cl. A22c 21/00
U.S. Cl. 99—107                                    3 Claims

ABSTRACT OF THE DISCLOSURE

A method for deboning eviscerated fowl by dividing the fowl into bone-containing pieces at least about one inch in the smallest dimension, partially cooking the pieces to promote separation of meat from bone and thereafter separating the meat portion from the bone portion by passing the meat through a perforated surface.

This invention relates to the removal of bone from fowl, such as chicken. It provides a method and apparatus for mechanically deboning whole fowl and yielding flavorful meat in a relatively finely divided form.

A number of mechanical methods have been developed over the years for bone removal from animals, including poultry. Unfortunately, none of these have proven thoroughly practical and commercially feasible, at least with respect to the preparation of deboned fowl where the end meat product is to be incorporated in an infant food. Consequently, prior practice in the art of providing a deboned source of fowl for infant foods has reverted to relatively primitive techniques. The main source of the deboned meat has been hand labor in which the bones are painstakingly and laboriously removed. The actual meat supplied is in the form of a mixture of raw boned, cooked, and giblets with the raw boned meat constituting the vast majority of the supply, i.e., more than 75%.

Such a source of supply has serious shortcomings. The hand labor involved is expensive and contributes to an undesirably high cost factor. Another disadvantage in the prior type of material that has been supplied for the production of a deboned fowl end product is in the taste and palatability area. Much of the good chicken flavor, for example, is lost in the preparation of the cooked portion of the material supplied by the deboner. The elements contributing some of the best flavors are lost in the fluids used in the cooking.

Probably the greatest difficulty encountered with the previously available type of deboned fowl lies in the area of sterility. As will be appreciated, where the fowl is going to be incorporated in an infant food product, it is essential that the bacterial count be kept within certain strict tolerances. Because of the gross handling of the meat by the deboner in the hand deboning of the fowl, the bacterial count has frequently increased beyond acceptable limits. When this occurs, the supplies must be discarded at great economic loss.

The accompanying drawing illustrates schematically one manner of practicing the present method for deboning fowl.

FIG. 1 shows the entire processing equipment utilized.
FIG. 2 is a sectional view taken along the line 2—2 of FIG. 1 showing the construction of the strainer and associated parts.

In accordance with the present process, fowl is deboned by dividing whole fowl into a plurality of pieces. These pieces comprise bone segments with raw meat attached thereto. The meat is then separated from the bone segments by passing the meat through the pores of a strainer while leaving the bone segments behind.

In preferred practice of the invention, after the fowl has been divided into pieces, the pieces are cooked sufficiently to soften the meat and promote severance thereof from the bone segments prior to passing the meat through the strainer pores. In practice, passage of the meat through the stainer pores is accomplished by moving the pieces of a fowl over the strainer surface in contact therewith. The meat, which is relatively soft, as compared with the bone, breaks down and is forced through the pores of the strainer while the bone is retained behind.

The above new technique has significant advantages. Loss of flavor by the use of deboned chicken that has been deboned through cooking at least part of the fowl is no longer a factor. In the instant process, even where the fowl is preliminarily cooked to facilitate severance of the meat from the bone, the cooking fluid can be conveniently passed through the strainer pores along with the meat and be preserved. As a result, all of the important flavor constituents can be incorporated in the end product.

At the same time, excessive cost factors which were incurred where hand labor was utilized for deboning is eliminated by the present mechanical concept which requires virtually no human handling of the fowl. This elimination of human handling in turn substantially reduces the possibility of bacterial contamination. The present products meet the highest standards in this respect.

One concern in mechanically removing the bone from fowl, especially where the fowl is destined for infant food, is in the residual bone content as evidenced by the calcium level found in the final meat product. Excessive calcium leaching from bone, which might be expected where the bone is broken up preliminarily to separation of meat, must be kept within prescribed limits or the process would have no practical value. In the present process, it has been found that the calcium content in the end product is significantly less than that present in end products derived from hand deboned fowl.

Maintenance of the calcium level within the requisite tolerances is accomplished in a number of ways. One of the more important is in connection with the preliminary cooking step which is preferably used to initially soften the meat and promote its ready severance from the bone. When this step is used, cooking is executed under time, temperature, pressure limits that result in a minimum of calcium leaching. Most important, the cooking in no event is continued beyond that point just sufficient to soften the meat and cause the meat to merely commence parting from the bone. At this point, the straining operation can be readily accomplished. Further cooking would provide little more help in this regard, but might result in an excessively high calcium content in the end product.

Another factor that has been found to contribute highly to the maintenance of the calcium content within prescribed tolerances is in the particular manner of dividing the whole fowl into smaller pieces suitable for processing. In this preferred aspect of the process, whole eviscerated chicken, for example, is cut by a suitable implement, such as a saw, along planes generally transverse to the longitudinal axes of the bones in the fowl. By cutting in this transverse manner, a minimum of cut bone ends result. This reduces the surfaces of bones that readily give up their calcium content to a minimum as compared with the cut surface area that exists if the bones are cut along their longitudinal axes. With the transverse cuts, leaching of calcium during cooking and subsequent processing is readily kept within acceptable limits.

With respect to the drawing, one manner of processing chicken is illustrated. In this illustration, chickens 10 and 10' are moved into cutting position in a longitudinal end to end relationship. A means for dividing the chicken into transverse slices such as a power-driven saw 11 divides the chicken into a plurality of slices, as shown at 12. The slices are conveniently cut to approximately one inch thickness. The chickens are whole and eviscerated and prior to this step advantageously have not been processed or handled in any other respect. Other types of apparatus for breaking up the fowl into smaller pieces is contemplated. For instance, good results have been achieved by processing chicken through a conventional extructor having a plurality of "hammer blades" which are rotated on a shaft. The blades break up and chop the fowl into pieces of selected size that will pass through an orifice plate at the discharge end of the unit.

The slices are then preliminarily partially cooked to promote severance of meat from bone. Thus, slices such as 13, 14, 15 are disposed in a suitable vessel 16 and are heated by heater 17. Depending upon the particular fowl used and other parameters, the period of heating will usually be about 20 minutes to 2 hours. The important point is that the heating be stopped at the earliest possible time and just as soon as the meat has softened and has just begun to part from the bone. In successful trials to date, cooking has been executed under water for one hour at 200° F. In another successful run, the meat and bone pieces were processed through a screw steamer for 30 minutes at 210° F.

Following the cooking period in vessel 16, the softened pieces, such as pieces 13, 14 and 15, are introduced into straining unit 18 through opening 19 so that the pieces are inserted interiorly of truncated conical strainer member 20. Strainer member 20 includes interiorly thereof a paddle wheel 21 turned by motor 22. The outer edges, such as rod 23 of the blades of paddle wheel 21, press the chicken pieces into contact with the interior surface of truncated conical strainer 20 and move them about the internal perimeter thereof. During this contacting and pressing relationship of the pieces about the internal perimeter of strainer 20, the meat leaves the bone segments and is forced through pores such as those shown at 24 of strainer 20 and is deposited in reservoir 25 for final processing to whatever consistency and form is desired. The bone segments remain behind interiorly of strainer 20 and are discharged through conduit 26 into container 27.

In general, the bone segments have cross sectional areas greater than the cross sectional areas of pore 24 and cannot physically pass through. Where a strainer unit of the type illustrated is utilized, it has been found that relatively rapid movement of the bone and chicken pieces internally produce optimum results. For example, paddle wheel 21 has been rotated at about 750–900 r.p.m., and excellent separations of meat and bone have been achieved.

The following example will illustrate the type of results that can be routinely expected with the present process.

EXAMPLE

Chicken was prepared by cutting it into one inch transverse slices. The chicken was frozen and had been cut open along the breast and backbone. The product was then pre-cooked under water in an open kettle for one hour at 200° F. The cooked pieces were then put through a conical strainer in which the pores were approximately ⅛" in diameter. The strainer was rotated at about 750 r.p.m.

93 pounds of frozen fowl were processed. From this, 14 pounds or 15% of bone was recovered. The meat obtained from the conical strainer was finished through a small finisher having a .033" screen. The following table lists the composition of the chicken puree obtained.

TABLE I.—CHICKEN PUREE

| | Percent Protein | Percent Total Solids | Percent Bone as is | Percent Bone on 30% Solids |
|---|---|---|---|---|
| ⅛" Conical Strainer | 7.35 | 13.7 | 0.023 | 0.05 |
| 0.033" Finisher | 4.94 | 10.3 | 0.009 | 0.026 |
| Waste 0.033" Finisher | 27.67 | 30.1 | 0.09 | 0.09 |
| Standard | | | | 0.05 |

For comparison, the bone content of "standard" chicken puree prepared in conventional fashion from regularly supplied hand deboned chicken is listed.

In another trial, the process was repeated using whole frozen eviscerated fowl. Again, 93 pounds of fowl were cut into one inch transverse strips and cooked for one hour in water at 200° F. The bone waste from the conical strainer at 750 r.p.m. was 12 pounds or 12.9%. The puree obtained from the strainer was finished through a finisher having a .033" screen. The results of the analysis of the product along with a "standard" hand deboned material for comparison is illustrated in Table II below.

TABLE II.—CHICKEN PUREE

| | Percent Protein | Percent Total Solids | Percent Bone as is | Percent Bone on 30% Solids |
|---|---|---|---|---|
| ⅛" Conical Strainer | 7.3 | 13.3 | 0.02 | 0.045 |
| 0.033" Finisher | 54.3 | 10.8 | 0.009 | 0.025 |
| Waste 0.033" Finisher | 22.34 | 25.4 | 0.93 | 1.18 |
| Standard | | | | 0.5 |

From the above it can be seen that the bone content of the products obtained from the present process is actually lower than the bone content of fowl that has been hand deboned. Analysis of the bacterial loads of the new materials shows them to be especially low and well within requisite tolerances. Most importantly, in taste panel trials, the products prepared in accordance with the present method were considered far superior to those prepared from the old hand deboned raw materials. Flavor and appearance were among the more important attributes considered in finding the present materials superior.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A method for deboning eviscerated whole fowl comprising: dividing said fowl into pieces of a predetermined thickness by cutting along planes generally transverse to the longitudinal axes of the bones thereof, cooking the divided pieces for a time and at a temperature sufficient for softening the meat to promote ready severance of the meat from the bone segments while minimizing calcium leaching from said bone segments, and then separating the meat from the bone segments by rapidly moving the pieces along a surface including a plurality of perforations whose largest dimensions are substantially less than said predetermined thickness while applying pressure to the pieces, so that said meat is forced through the perforations while said bone segments are retained on the surface.

2. A method for deboning fowl in accordance with claim 1 wherein said fowl is divided by sawing at approximately one inch intervals.

3. A method for deboning fowl in accordance with claim 1 wherein said perforations have a diameter of approximately one-eighth inch.

References Cited

UNITED STATES PATENTS

| 2,858,222 | 10/1958 | Harris et al. | 99—107 |
|---|---|---|---|
| 2,978,739 | 4/1961 | Goldberg. | |
| 3,266,543 | 8/1966 | Paoli | 146—76 |

HYMAN LORD, Primary Examiner

U.S. Cl. X.R.

17—1; 146—76